United States Patent [19]

Niedermayr

[11] Patent Number: 4,611,296

[45] Date of Patent: Sep. 9, 1986

[54] MANIPULATION DEVICE SUCH AS AN INDUSTRIAL ROBOT HAVING AT LEAST ONE SENSOR

[75] Inventor: Erich Niedermayr, Munich, Fed. Rep. of Germany

[73] Assignee: Siemens Aktiengesellschaft, Berlin & Munich, Fed. Rep. of Germany

[21] Appl. No.: 660,382

[22] Filed: Oct. 12, 1984

[30] Foreign Application Priority Data

Nov. 11, 1983 [DE] Fed. Rep. of Germany ....... 3340946

[51] Int. Cl.⁴ .............................................. G06F 15/46
[52] U.S. Cl. ..................................... 364/513; 364/138; 364/579; 364/580; 414/730; 901/34; 901/38; 901/46
[58] Field of Search ................. 364/513, 478, 191–193, 364/138, 139, 550, 551, 579, 580; 318/568, 639; 901/9, 10, 31–35, 38, 46, 47; 414/730; 324/115

[56] References Cited

U.S. PATENT DOCUMENTS

| | | |
|---|---|---|
| 4,001,556 | 1/1977 | Folchi et al. .................... 364/513 |
| 4,132,318 | 1/1979 | Wang et al. ................. 364/513 X |
| 4,362,978 | 12/1982 | Pollard et al. .................. 364/513 X |
| 4,412,121 | 10/1983 | Kremers et al. .................. 901/47 X |
| 4,467,436 | 8/1984 | Chance et al. ....................... 364/513 |
| 4,481,569 | 11/1984 | Hoodbhoy ...................... 364/513 X |

Primary Examiner—Joseph Ruggiero
Attorney, Agent, or Firm—Hill, Van Santen, Steadman & Simpson

[57] ABSTRACT

A manipulation device, such as an industrial robot has at least one sensor connected to a control unit through a programmable sensor interface. The programmable sensor interface includes at least one microprocessor and at least one memory. Each sensor has three signal ranges, the limits of these ranges being selectable by thresholds which can be stored in the memory. The microprocessor is programmed to classify the signal received from a sensor in one of the signal ranges, and to transmit the result of the classification to the control unit. Activation of the individual sensors is undertaken by the control unit through a serial interface or through a parallel interface.

17 Claims, 16 Drawing Figures

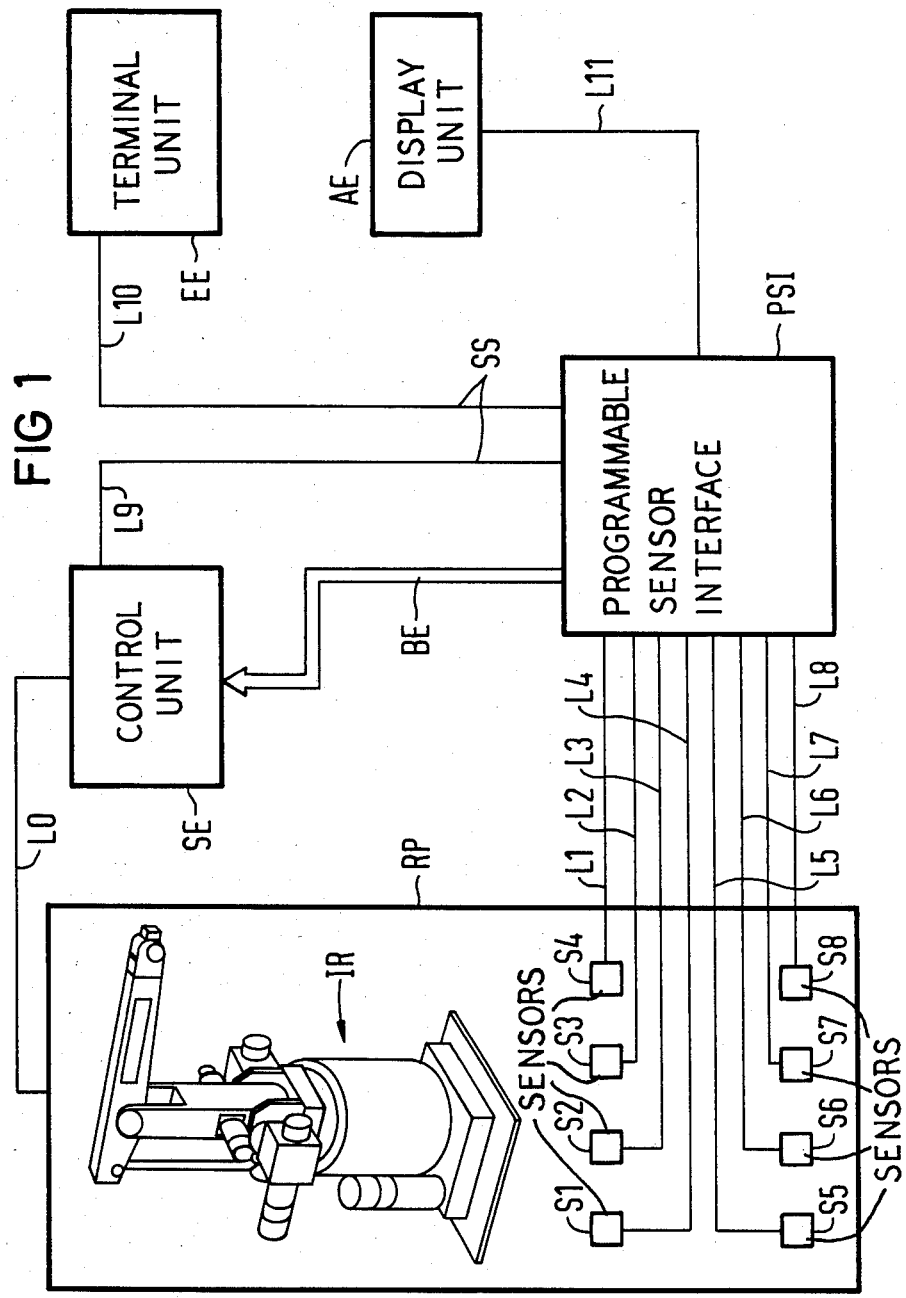

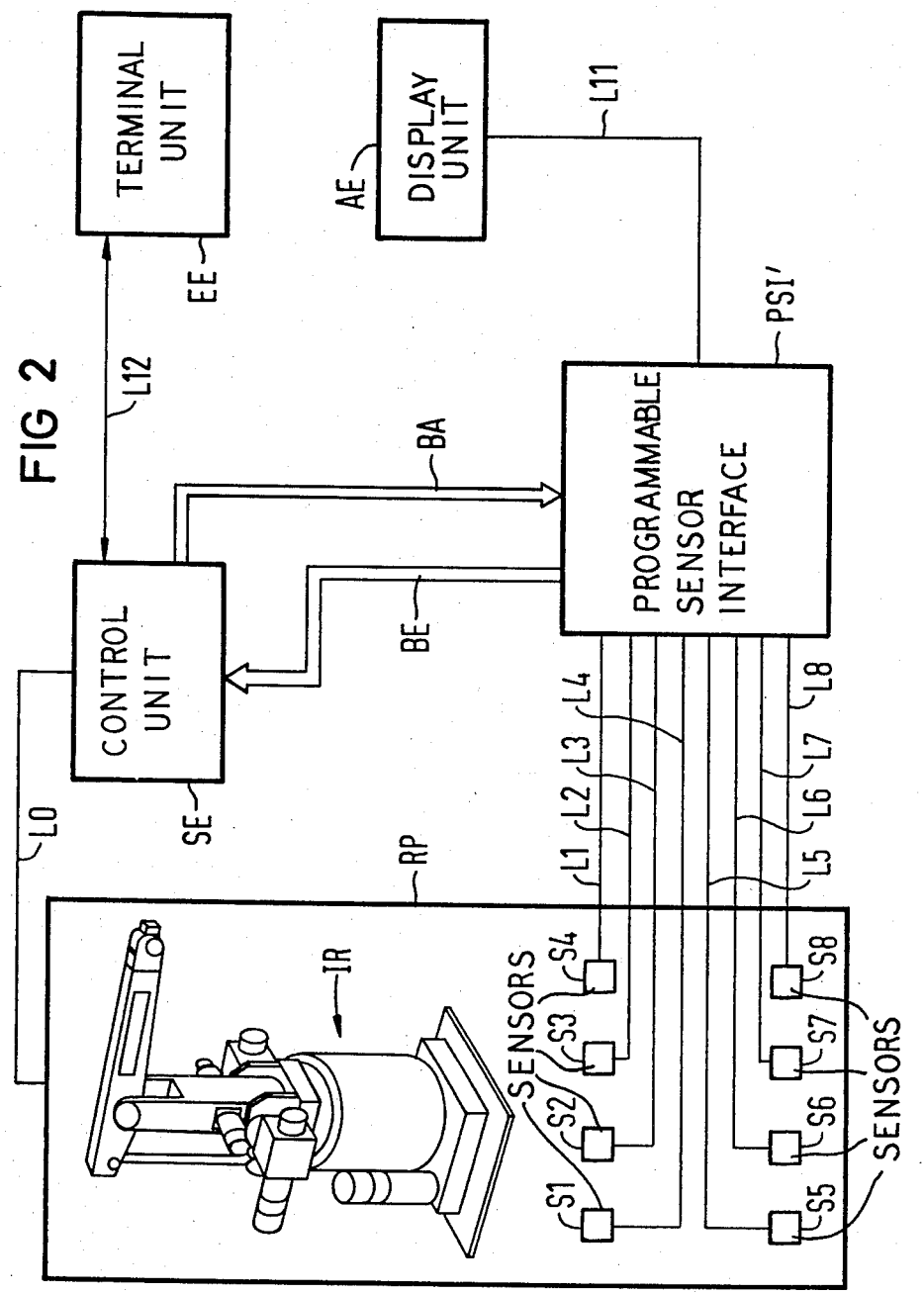

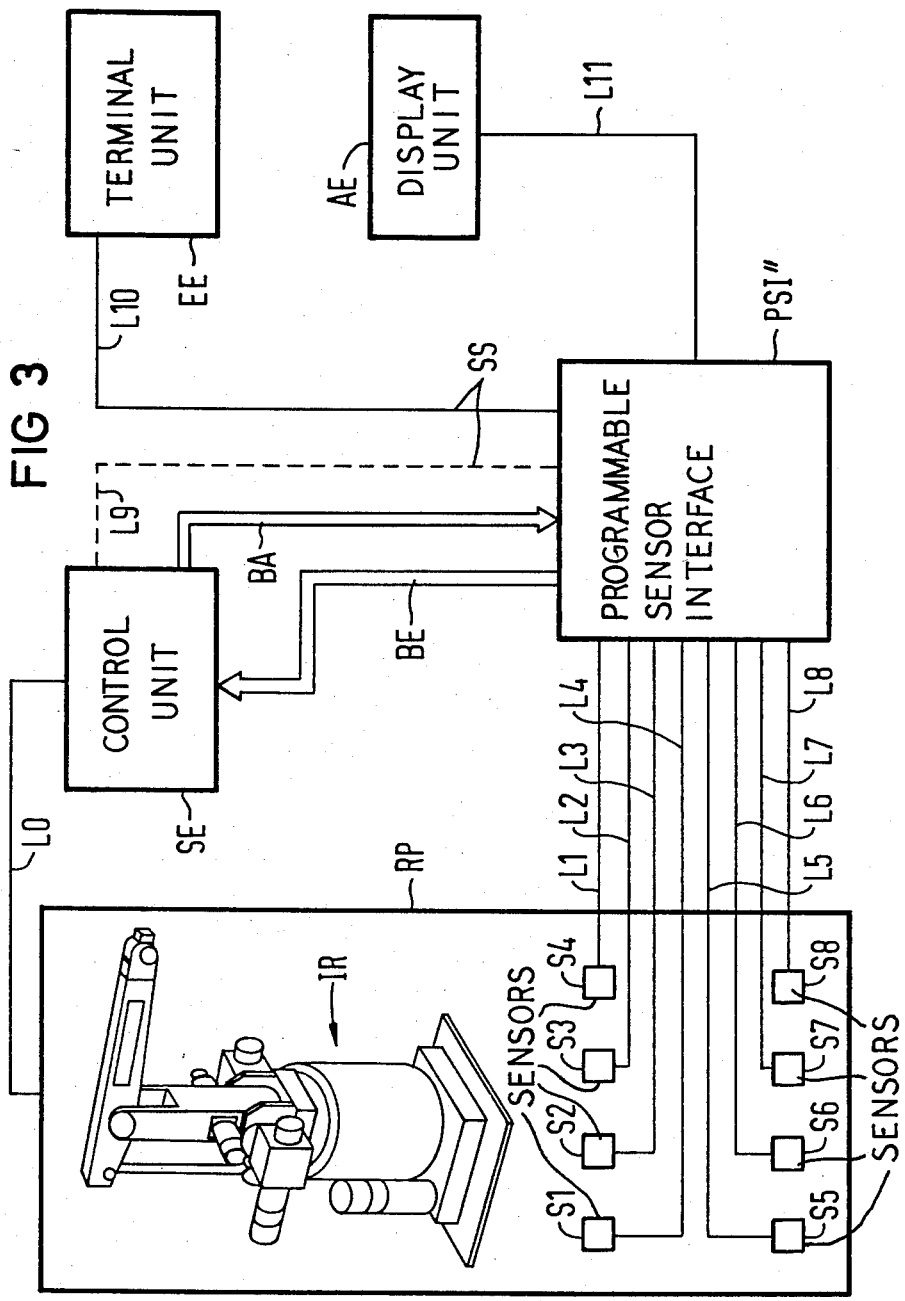

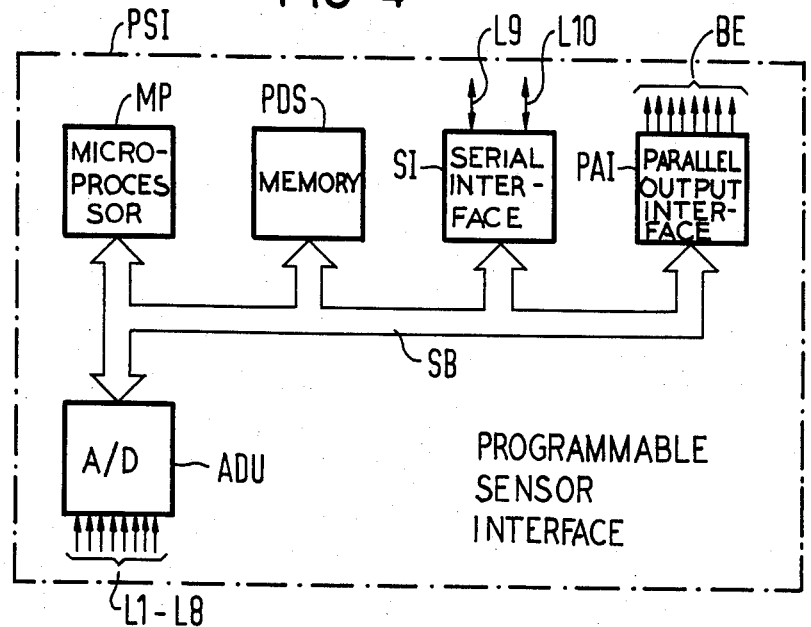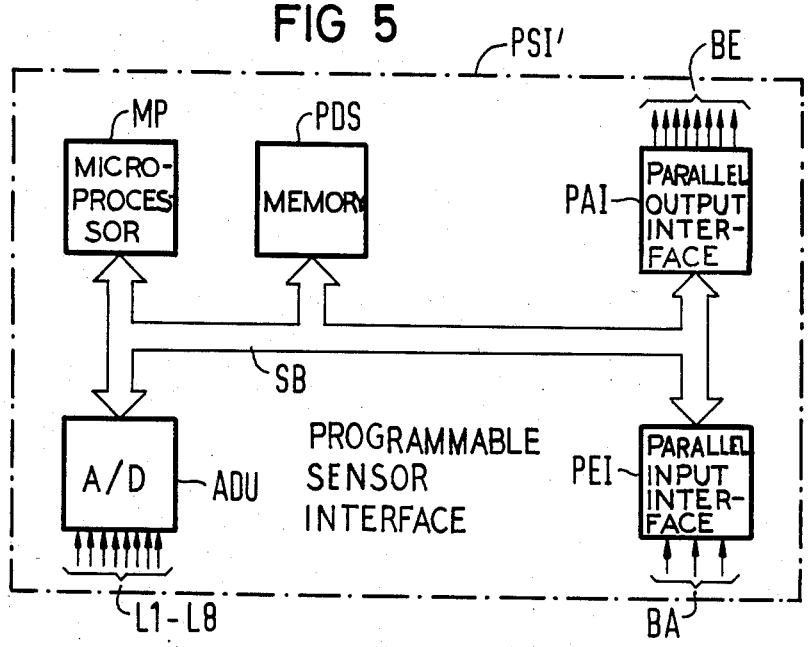

MANIPULATION DEVICE SUCH AS AN INDUSTRIAL ROBOT HAVING AT LEAST ONE SENSOR

BACKGROUND OF THE INVENTION

1. Field of the Invention

The present invention relates to manipulation devices, and in particular to an industrial robot having a control unit and at least one sensor connected to the control unit through an interface.

2. Description of the Prior Art

The successful use of manipulation devices such as industrial robots depends in large part upon the adaptability of these devices to accommodate different parts and environmental influences. Such industrial robots generally are programmable in a plurality of movement axes and are equipped with grippers (claws) or other tools. Various sensors, such as optical and tactile sensors, are employed for this purpose. The sensors being coupled to the robot and providing signals for influencing the operation thereof. In assembly technology, for example, tactile sensors such as path, force or moment sensors are required in addition to optical sensors for identifying the position of parts to be picked-up and/or transported. The individual assembly operations are monitored with these tactile sensors. In most cases, the signals of the sensors are classified for this purpose, that is, the signals are compared to specific thresholds. If, for example, a bushing is to be pressed by a robot onto a shaft, two thresholds are employed which divide the overall signal range of a force sensor, for example, into three signal ranges which are utilized for the assembly operation. If the sensed force exceeds an upper threshold, for example, an error may exist in that too little play exists between the bushing and the shaft, or the bushing may be canted. If the sensed force is in the mid-range between the upper threshold and a lower threshold, a properly executed assembly step is assumed. If the sensed force falls below the lower threshold, an error arises which may be attributed to too little play between the bushing and the shaft, or to the absence of a bushing. The significance of the signal received from a sensor is thus dependent upon the point in time of the sampling during an event, which requires corresponding processing to be undertaken and the program execution.

Most conventional industrial robots have a control means with simple branch or interrupt instructions, with the status of binary input signals or signal combinations being the deciding factor. Accordingly, sensors are generally employed which enable simple binary decisions such as, for example, reports concerning the presence or completeness of a work piece, or the attainment of a prescribed position. Such thresholds are constant as a result of the mechanical construction or as a result of rigidly prescribed comparison values. Such binary decisions, however, are inadequate for complex assembly tasks because adaptation to changed conditions is not possible.

Industrial robots are also known wherein the signals in digital form of individual sensors are directly supplied to the control means, and are classified when processed in the program run in order to achieve the required statements. The control means required for this purpose, however, are complicated in structure and are often too costly for economical employment of industrial robots in an assembly sequence.

The use of optical sensors for position detection in the context of industrial robots for automatic assembly is described in the periodical "VDI Nachrichten," Number 52, Dec. 26, 1980 at page 13. These optical sensors are directly connected to the control means through a special interface. Programming of the optical sensors is simplified by the use of menus which are shown on a monitor and which are selected. Various parameters may also be defined by means of a light pen. Transfer of this technology for optical sensors to sensors such as tactile sensors, ultrasound sensors or other types of sensors having an analog output is, however, not possible.

SUMMARY OF THE INVENTION

It is an object of the present invention to provide a manipulation device such as an industrial robot which permits utilization of tactile sensors and other sensors having an analog output for complex assembly tasks with low outlay.

The above object is inventively achieved in a manipulation device having at least one sensor on a movable part of the robot which is connected to a control unit through a programmable sensor interface, the programmable sensor interface having at least one microprocessor and at least one memory. Each sensor has three signal ranges allocated thereto, the range limits being determined by thresholds which are stored in the memory. The microprocessor is programmable such that the signals received from a sensor converted to digital form are classified in one of the allocated signal ranges, and the result of the classification is transmitted to the control unit.

Connection of a sensor or of a plurality of sensors to the control unit thus occurs through the programmable sensor interface which, as a result of being equipped with a microprocessor, may be referred to as an "intelligent." The programmable sensor interface enables signal pre-processing with the results thereof being transferred to the control unit. The analog signal values of the sensors are first converted to digital form and classified in signal ranges whose range limits can be selected by means of thresholds stored in the memory. Classification of the pending signal of a sensor in one of the signal ranges is forwarded to the control unit, so that the information concerning an operation being monitored which is associated with this classification can be taken into account in the program run. Outlay for signal pre-processing by means of such a programmable sensor interface is relatively low.

In one embodiment of the invention every sensor is selectable through the control unit and classification of the digital signals of the selected sensor into one of the allocated signal ranges is forwarded to the control means. The signal of every individual sensor can thus be sampled in the program run in a simple manner, and the result of this sampling can be immediately taken into account during the program run. Selection of the sensors can be undertaken such that every sensor is selected through a serial interface interconnected between the control unit and terminal equipment. It is also possible that each sensor be selected by means of parallel binary output lines connected to the control unit.

In another embodiment of the invention each sensor is selectable through the terminal equipment and/or the control means and the serial interface, and the thresholds of the signal ranges of the selected sensor are transmitted to the memory. Particularly simple programming is enabled wherein a particular sensor is selected and the thresholds for its range limits are then prescribed. It is also possible that the thresholds of the range limits of a sensor be varied during the program run so as to be adaptable to changing conditions under certain circumstances.

The programmable sensor interface also preferably has a display unit connected thereto through which the selected sensor, the digital signal thereof, and the signal range allocated to this signal can be perceived. The favorable thresholds for the range limits can then be identified with the assistance of this display means, particularly during setting operations, and can then be stored in the memory.

In a further embodiment of the invention a binary input line of the control unit is allocated to each signal range of the sensors. When the signal of a selected sensor is classified in a particular signal range, the binary signal line allocated to this signal range is set, and all other binary input lines are cleared.

Only a limited number of binary inputs is available given control units for many manipulation devices. Under such conditions, it is preferable for the binary input lines of the control unit to be selectively connectable to the programmable sensor interface or peripheral units through a multiplexer.

The analog signals of each sensor are preferably supplied to an analog-to-digital converter of the programmable sensor interface. Integration of the analog-to-digital converter in the programmable sensor interface enables a particularly simple linking of the corresponding buses.

In a further embodiment of the invention, the programmable sensor interface has a parallel output interface with binary outputs connected to allocated binary input lines of the control unit. The programmable sensor interface may also include a serial interface which is connected to the control unit and the allocated terminal equipment. In a corresponding manner, the programmable sensor interface may also include a parallel input interface having binary inputs to which binary output lines of the control unit are connected. Such interfaces function to permit simple adaptation and connection of the programmable sensor interface to the control unit and, under certain conditions, to the terminal equipment.

A further embodiment of the invention has a programmable gripper or claw with at least one path measuring means and/or at least one force measuring means, driven by at least one drive motor. The digital actual value signals of the path measuring means and/or the force measuring means are supplied to the microprocessor, and the drive motor is selectable via the control means, the microprocessor and a digital-to-analog converter such that the gripper position and/or the gripper force can be set to selected rated values with the microprocessor as the final control element, and the drive element as the positioning element. When the programmable sensor interface is connected through a serial interface to the control means, the rated values for the gripper position and/or the gripper force are selectable through the control means and the serial interface. This selection of the rated values in the program run, however, is no longer possible when the programmable sensor interface is connected to parallel binary output lines of the control unit. In this situation, the rated values for the gripper position and/or the gripper force can be stored in the memory.

DESCRIPTION OF THE DRAWINGS

FIG. 1 is a schematic diagram showing the basic elements of an industrial robot with control circuitry including a programmable sensor interface for serial operating mode constructed in accordance with the principles of the present invention.

FIG. 2 is a schematic diagram showing an industrial robot and control circuitry including a programmable sensor interface for parallel operating mode constructed in accordance wth the principles of the present invention.

FIG. 3 is a schematic diagram showing an industrial robot and control circuitry including a programmable sensor interface for serial and/or parallel operating modes constructed in accordance with the principles of the present invention.

FIG. 4 is a block diagram of the programmable sensor interface shown in FIG. 1.

FIG. 5 is a block diagram of the programmable sensor interface shown in FIG. 2.

DESCRIPTION OF THE PREFERRED EMBODIMENTS

Figure 6:
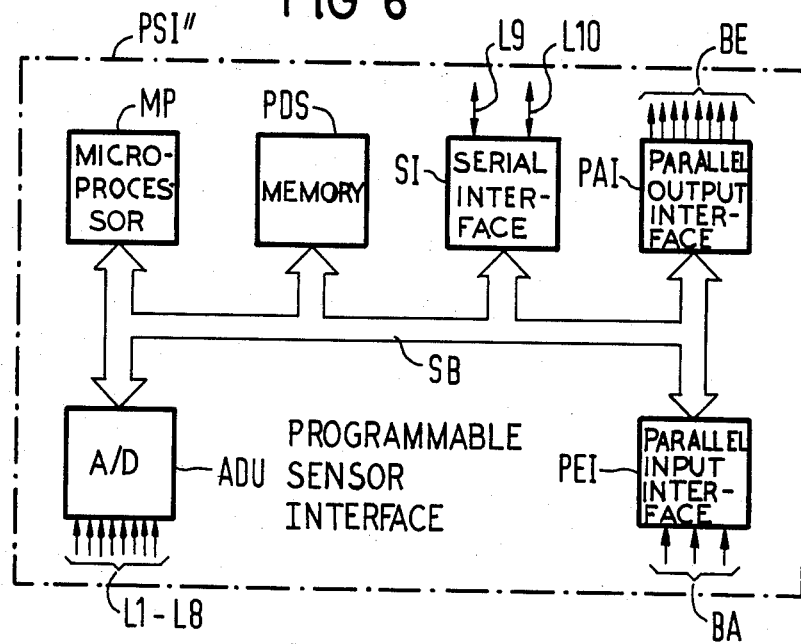
FIG. 6 is a block diagram of the programmable sensor interface shown in FIG. 3.

A manipulation device RP and control circuitry therefor are schematically shown in FIG. 1. The manipulation device RP includes an industrial robot IR and a plurality of sensors S1 through S8 which may be disposed on the movable arm of the industrial robot IR or within the periphery thereof as indicated within the box RP. The sensors S1 through S8 may be tactile sensors such as path, force or moment sensors, ultrasound sensors, or any sensor having an analog output.

The robot kinematics are connected to a control unit SE by a control line L0. The sensors S1 through S8 are connected by respective lines L1 through L8 to a programmable sensor interface PSI, which is in turn connected by a line L9 to the control unit SE, and by a line L10 to a terminal unit EE. The lines L9 and L10 form a serial interface SS between the programmable sensor interface PSI and the control unit SE and the terminal equipment EE. The programmable sensor interface PSI is also connected to the control unit SE by a plurality, such as eight, binary input lines BE. The terminal unit EE may, for example, be a standard terminal or a printer. The programmable sensor interface PSI may also be connected via a line 11 to an optical display unit AE.

Pre-processing of the analog signals from the sensors S1 through S8 is undertaken by means of the programmable sensor interface PSI, the result of the pre-processing being forwarded to the control unit SE. One of the sensors S1 through S8 is first selected by the control unit SE and the serial interface SS during the course of this pre-processing. The pending digitalized signal of the selected sensor is then classified in one signal range of a total of eight possible signal ranges, whereupon the binary input line BE of the control unit SE which is allocated to this signal range is set, and the remaining binary input lines BE associated with the other signal ranges are cleared. The information received by the control unit SE by means of the signal of the selected sensor and by means of the classification thereof in a single range is then taken into account in the further program run. The display unit AE allocated to the programmable sensor interface PSI displays the number of the sensor selected from the sensors S1 through S8, the size of the digitalized signal of the selected signal, and the signal range in which the current signal is classified.

In the embodiment shown in FIG. 1, the control unit SE has a serial interface SS available. As mentioned above, one of the sensors S1 through S8 may be selected by the control unit SE through this serial interface SS. The serial interface SS has the further advantage that the signal ranges allocated to the sensors S1 through S8 may be selected by the control unit SE, and may be varied during the program run.

In the embodiment shown in FIG. 2, three parallel binary output lines BA of the control unit SE are available instead of the serial interface SS, and the control unit SE is directly connected to the terminal equipment EE through a line L12. The programmable sensor interface PSI' in FIG. 2 is connected to the three parallel binary output lines BA of the control unit SE such that each of the sensors S1 through S8 can be selected by the control unit SE because a total of eight possibilities are available given three parallel binary lines. The signal ranges allocated to the sensors S1 through S8, however, can no longer be selected by the binary output lines BA or varied during the program run, that is, the thresholds of the signal ranges must be permanently stored in a memory of the programmable sensor interface PSI'.

In the embodiment shown in FIG. 3, a programmable sensor interface PSI'' is provided suitable both for serial operating mode according to FIG. 1 and for parallel operating mode according to FIG. 2. The programmable sensor interface PSI'' in the embodiment of FIG. 3 can be connected to the control unit SE through a serial interface SS (lines L9 and L10) and connection to the control unit SE is also enabled by binary output lines BA. If both types of connections are provided, the line L9 may be eliminated, as indicated by the dashed line in FIG. 3. This embodiment also provides the possibility of selection between the serial operating mode and the parallel operating mode. After switching into the serial mode, the thresholds of the signal ranges stored in a memory of the programmable sensor interface PSI'' for the parallel mode can be temporarily changed by the user by means of the terminal unit EE for testing purposes. This can be beneficial for a set-up mode for the device RP. Control of the unit can be undertaken such that the thresholds of the signal ranges are entered by the serial interface SS even in the parallel mode, that is, the thresholds of the sensor selected by the serial interface SS are set, but only that sensor among the sensors S1 through S8 which is selected by the three parallel binary output lines BA is activiated.

A block diagram for the programmable sensor interface PSI suitable for the embodiment of FIG. 1 is shown in FIG. 4. The programmable sensor interface PSI includes a microprocessor MP, a program and data memory PDS, a serial interface SI, a parallel output interface PAI, and an analog-to-digital converter ADU. The components are connected to each other by means of a system bus SB. The system bus SB represents a combination control bus, address bus and data bus. The analog signals of the sensors S1 through S8 are supplied to the analog-to-digital converter ADU along the corresponding lines L1 through L8, so that the analog signals of the sensor respectively selected from among the sensors S1 through S8 can be converted to digital form in the analog-to-digital converter ADU. The serial interface SI is provided for enabling connection to the serial interface SS shown in FIG. 1. The serial interface SI thus has the task of converting the serial data into parallel data, and for undertaking an adaptation of the voltage level to the microprocessor MP. In a corresponding manner, the parallel output interface PAI enables adaptation and connection of the eight binary input lines BE of the control unit SE. In addition to storing the program, the program and data memory PDS also functions for storage of the thresholds of the signal ranges allocated to the sensors S1 through S8. The microprocessor MP is programmed so as to classify the signal of the selected sensor in one of the allocated signal ranges, the signal having been converted to digital form in the converter ADU. The classification is forwarded to the control unit SE by the binary input line BE allocated to this signal range.

Each of the sensors S1 through S8 may be selected by the terminal unit EE and/or the control unit SE and the serial interface SS, whereupon the thresholds of the signal ranges of the selected sensor can then be transmitted to the program and data memory PDS. This operation can be undertaken both for setting the thresholds when programming, as well as for varying the thresholds during the program runs.

A block diagram for a programmable sensor interface PSI' for the embodiment of FIG. 2 is shown in FIG. 5. This programmable sensor interface PSI' is designed for the parallel operating mode and differs from the programmable sensor interface PSI shown in FIG. 4 by the inclusion of a parallel input interface PEI in place of the serial interface SI. The parallel interface PEI connects the three parallel binary output lines BA of the control unit SE to the programmable sensor interface PSI'. The thresholds of the signal ranges of the individual sensors are stored in the program and data memory PDS which may be an erasable programmable read only memory (EPROM).

A block diagram for the programmable sensor interface PSI" of the embodiment of FIG. 6 is shown in FIG. 3. The programmable sensor interface PSI" is designed for operation both in serial and parallel modes, and is a combination of the programmable sensor interface PSI of FIG. 4 and the programmable sensor interface PSI' of FIG. 5 in that it includes both the serial interface SI and the parallel input interface PEI. The programmable sensor interface PSI" can thus be flexibly matched to the control unit SE with a serial interface SS or parallel binary output lines BA being available. When the serial interface SS and the parallel binary output lines BA are available at the same time, a selection may be undertaken between the serial and parallel modes.

Figure 7:
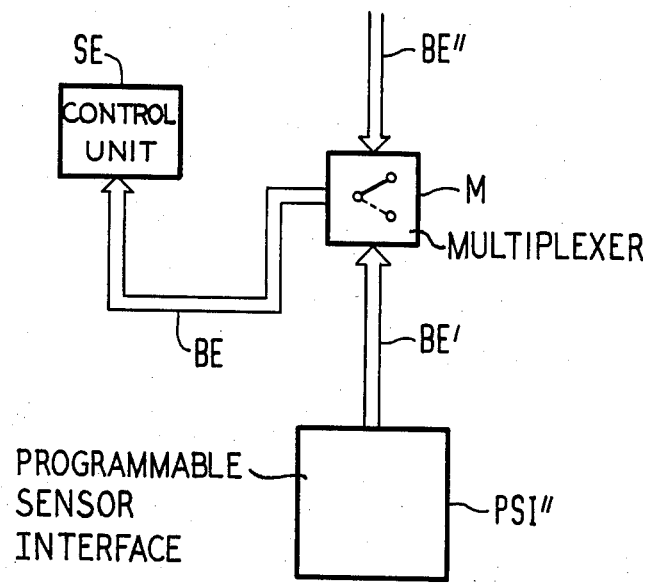
FIG. 7 is a block diagram showing a multiplexer for use with the programmable sensor interface and the control unit in one of the above embodiments.

A multiplexer M by means of which the binary input lines BE of the control unit SE can be selectively connected to the periphery or to the programmable sensor interface PSI" is shown in FIG. 7. The binary input lines from the programmable sensor interface PSI" to the multiplexer M are referenced BE', and the binary input lines leading from the periphery, for example, from valves, signal generators, limit switches and the like, to the multiplexer M are referenced BE". When an instruction that one of the sensors S1 through S8 is to be activated is forwarded by the control unit SE to the programmable sensor interface PSI", for example by means of a predetermined special character, the multiplexer M disconnects the input lines BE" of the periphery and connects the input lines BE' of the programmable sensor interface PSI". Depending upon the classification of the digital signal of the sensor in one of the signal ranges, the binary input line allocated to this signal range is then set. The use of such a multiplexer M is particularly advantageous when only a limited number of binary inputs are available at the control unit SE, or when the signals of a larger number of sensors must be interpreted.

Figure 8:
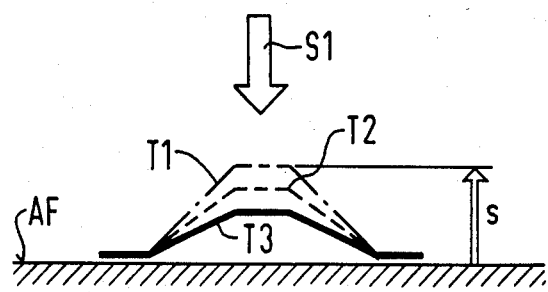
FIG. 8 is a diagram showing examples for the signal ranges associated with a path sensor for use in one of the above embodiments.

FIG. 8 schematically represents a situation wherein a classification is undertaken with the assistance of one of the aforementioned programmable sensor interfaces.

Figure 9:
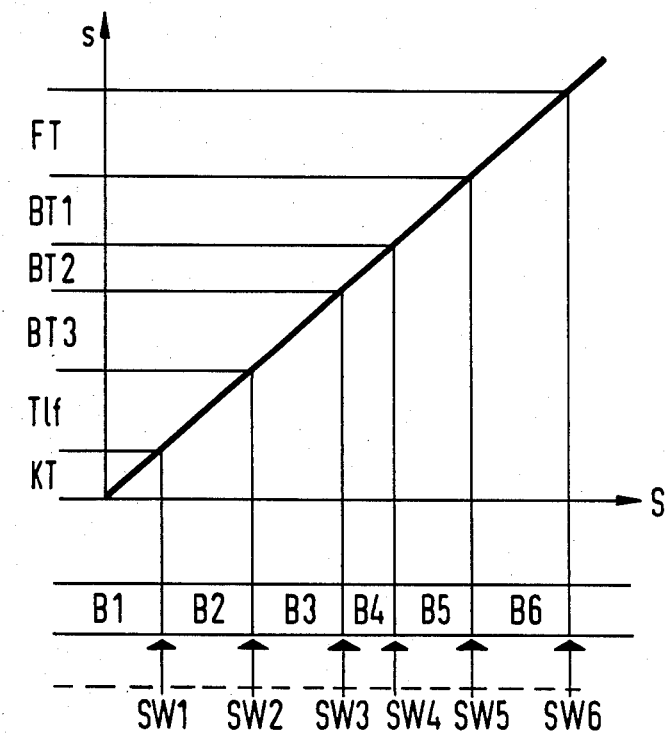
FIG. 9 shows a diagram for the signal ranges associated with the path sensor for classifying the signal received therefrom according to FIG. 8.

In FIG. 8, one of parts T1 or T2 (shown in dashed lines) or T3 (shown in solid lines) is to be grasped by the gripper of an industrial robot. The parts T1, T2 and T3 are on a supporting surface AF and differ in height. A sensor S1, schematically represented in FIG. 8 by an arrow, is disposed on the gripper and is a path sensor which detects the distance s of the upper side of the parts T1 or T2 or T3 from the supporting surface AF. In the diagram shown in FIG. 9, the relationship between the distance S, entered on the ordinate, and the signal S of the sensor S1, entered on the abscissa, is shown. The pending digital signal S can be classified in one of six signal ranges B1 through B6 having range limits prescribed by thresholds SW1 through SW6 stored in the program and data memory PDS. The various statements shown on the vertical axis associated with adjacent thresholds may be as follows: the statement KT may indicate no part present, the statement T1f may indicate the part being incorrectly disposed on the surface AF, the statement BT3 may indicate part T3 is present, the statement BT2 may indicate the part 2 is present, the statement BT1 may indicate the part T1 is present, and the statement FT may indicate the presence of a wrong part. Each of these statements is assigned within the corresponding ranges of the distance S to the signal ranges B1 through B6 respectively. The three different parts T1, T2 and T3, and the three fault situations can thus be discriminated and taken into consideration in the program run by classifying the signal S in the six signal ranges B1 through B6.

Figure 10:
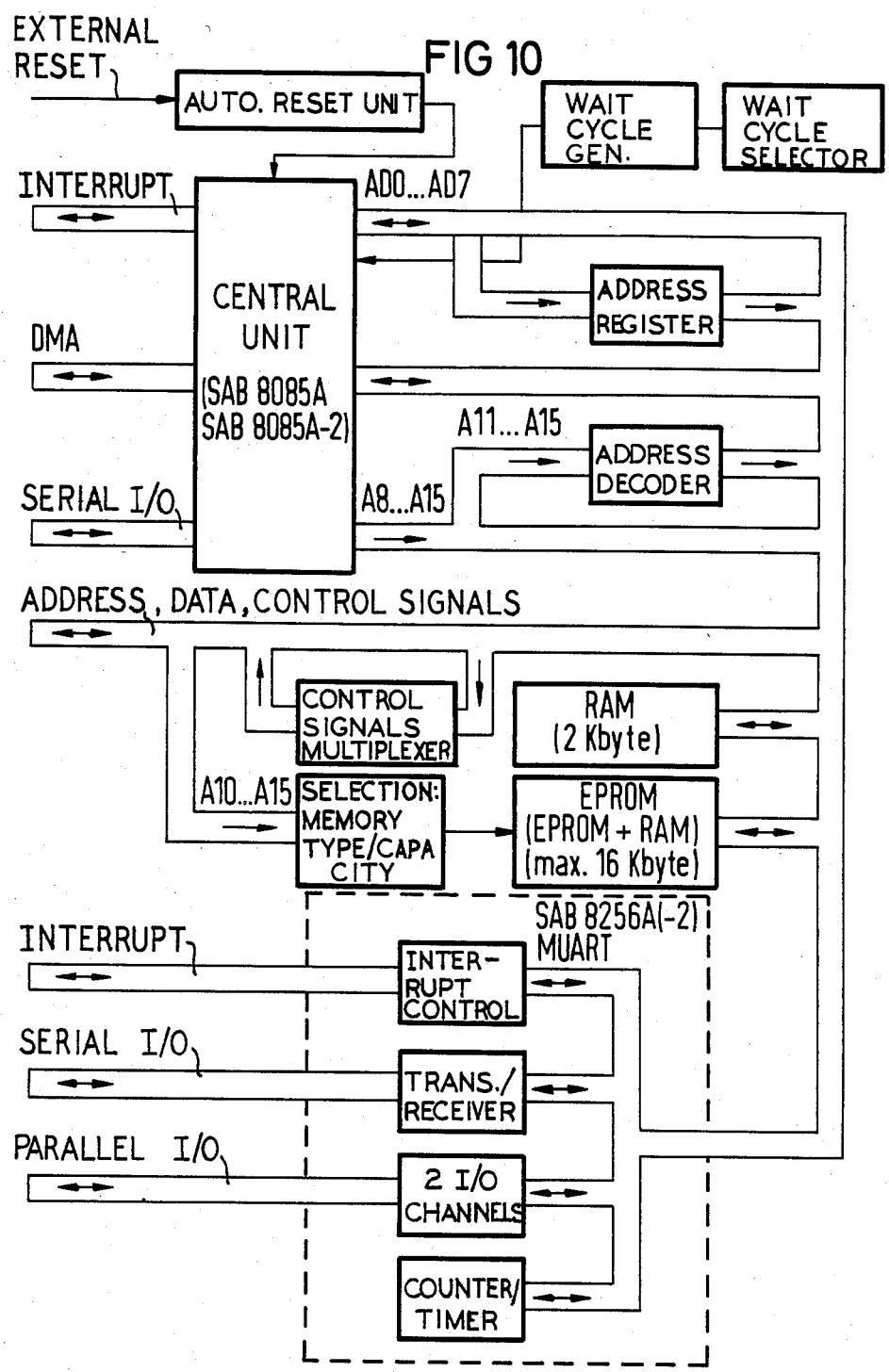
FIG. 10 is a block diagram of a microcomputer module suitable for use as the programmable sensor interface shown in FIG. 6.
Figure 11:
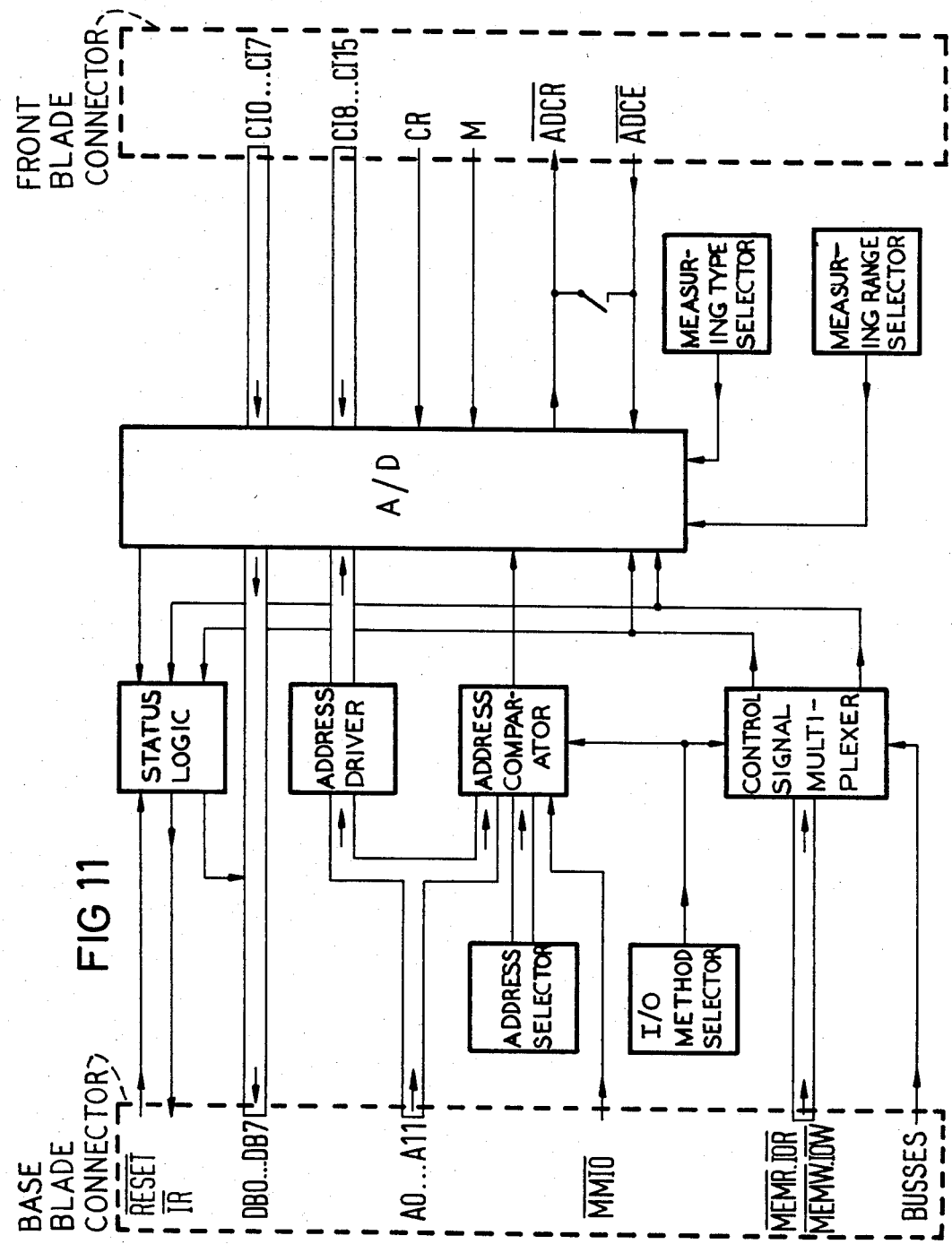
FIG. 11 is a block diagram of an analog-to-digital converter module suitable for use as the programmable sensor interface shown in FIG. 6.

A block diagram of a microcomputer module suitable for use in the programmable sensor interface of FIG. 6 is shown in FIG. 10, and a block diagram of an analog-to-digital converter module also suitable for use in the programmable sensor interface of FIG. 6 is shown in FIG. 11. The programmable sensor interface PSI" of FIG. 6 may be comprised of these two modules. The microcomputer module shown in FIG. 10 is a commercially available central computer SMP-E4-A3 described in complete detail in the publication "SMP Microcomputer-Baugruppensystem, SMP-E4-A3/A5 Zentralcomputer, Technische Beschreibung 8.82" of Siemens AG. The analog-to-digital converter module of FIG. 11 is a commercially available component SMP-E230 described in full detail in the publication "Technische Beschreibung Ausgabe 12.79, SMP-E230 Abzustand 1, Analoge Engabe mit 16 Eingaengen" of Siemens AG. The legends shown in FIG. 10 are referenced with respect to the format and function of these modules.

The bus labeled "addresses, data, control signals" in FIG. 10 is connected with corresponding signals of the base blade connector shown in FIG. 11 for the purpose of combining the modules of FIGS. 10 and 11 to form the programmable sensor interface PSI" of FIG. 6. The lines L1 through L8 in FIG. 3 for the sensors S1 through S8 are connected to the voltage inputs referenced CI0 ... CI7 or CI8 ... CI15 in FIG. 11. The lines L9 and L10 shown in FIGS. 3 and 6 are connected to the bus labeled serial S/O in FIG. 10. The binary input lines BE and binary output lines BA shown in FIGS. 3 and 6 are connected to the bus referenced parallel I/O in FIG. 10.

Figure 12:
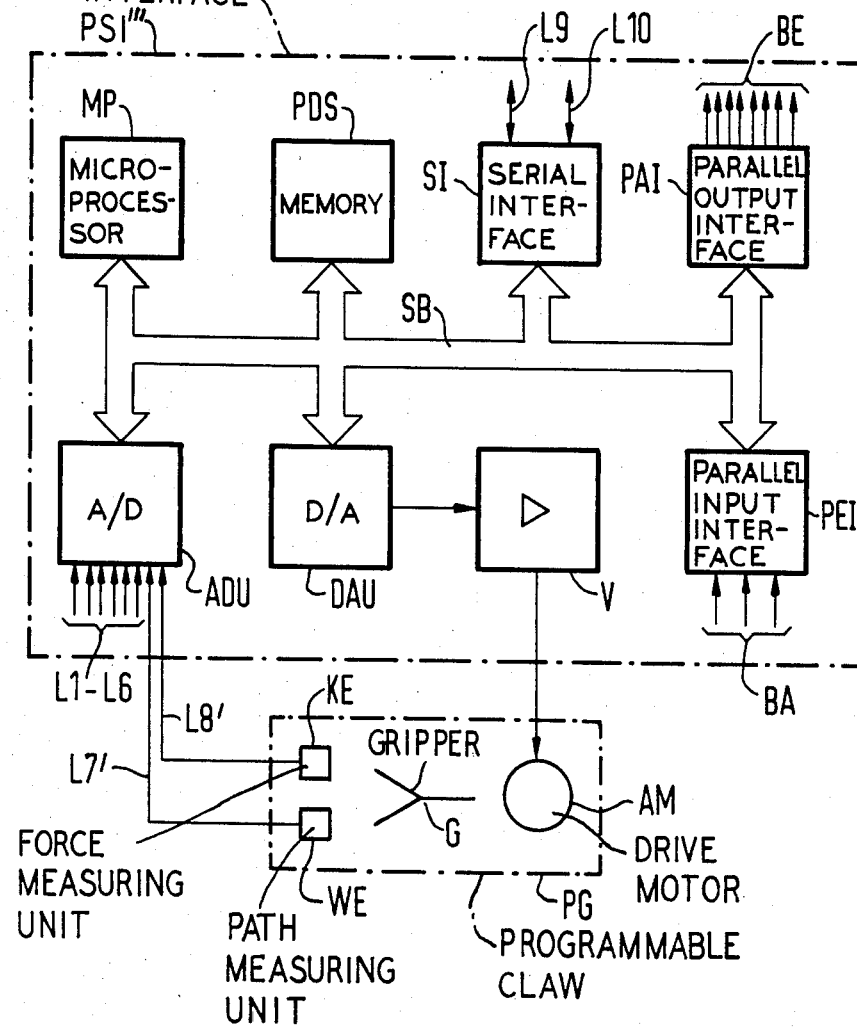
FIG. 12 is a block diagram of a programmable sensor interface with additional control means for controlling the gripper position and/or gripper force of a programmable claw.

A block diagram for a programmable sensor interface with additional control of the position and/or force of a programmable claw or gripper is shown in FIG. 12. In addition to an open or closed gripper position, such programmable claws may, for example, be set to other claw positions having desired position for the gripping jaws, so that the claw may, for example, be introduced into cavities into which it could not penetrate given a fully open gripper position. The gripping force may be set such that sensitive parts are not damaged when grasped.

The programmable sensor interface PSI''' shown in FIG. 12 differs from the programmable sensor interface PSI" shown in FIG. 6 by the inclusion of a digital-to-analog converter DAU which is connected to the system bus SB and which is followed by an amplifier V.

The programmable claw PG shown in schematic representation includes a gripper G, a drive motor AM for actuating the gripper G, a path measuring unit WE for detecting the position of the gripping jaws of the gripper G, and a force measuring unit KE for detecting the gripping force of the jaws of the gripper G. The path measuring unit WE and the force measuring unit KE are connected to the analog-to-digital converter ADU by lines L7' and L8' respectively. The remaining lines L1 through L6 connected to the analog-to-digital converter ADU function as described above for connecting the sensors S1 through S6.

The drive motor AM is operated by the control unit SE, the microprocessor MP, the digital-to-analog converter DAU, and the amplifier V such that the gripper position and/or the gripping force may be set to rated values prescribed in the program run, these values being set with the microprocessor MP as the final control element, and the drive motor AM as the positioning element. The digital actual value signals of the path measuring unit WE and the force measuring unit KE are supplied to the microprocessor MP without classification into signal ranges being undertaken, in contrast to the signals from the sensors S1 through S6.

FIGS. 13 through 16 are structograms, also known as Nassi-Schneiderman diagrams which represent the logic sequences for the serial mode of the programmable sensor interface PSI″ shown in FIGS. 3 and 6.

Figure 13:
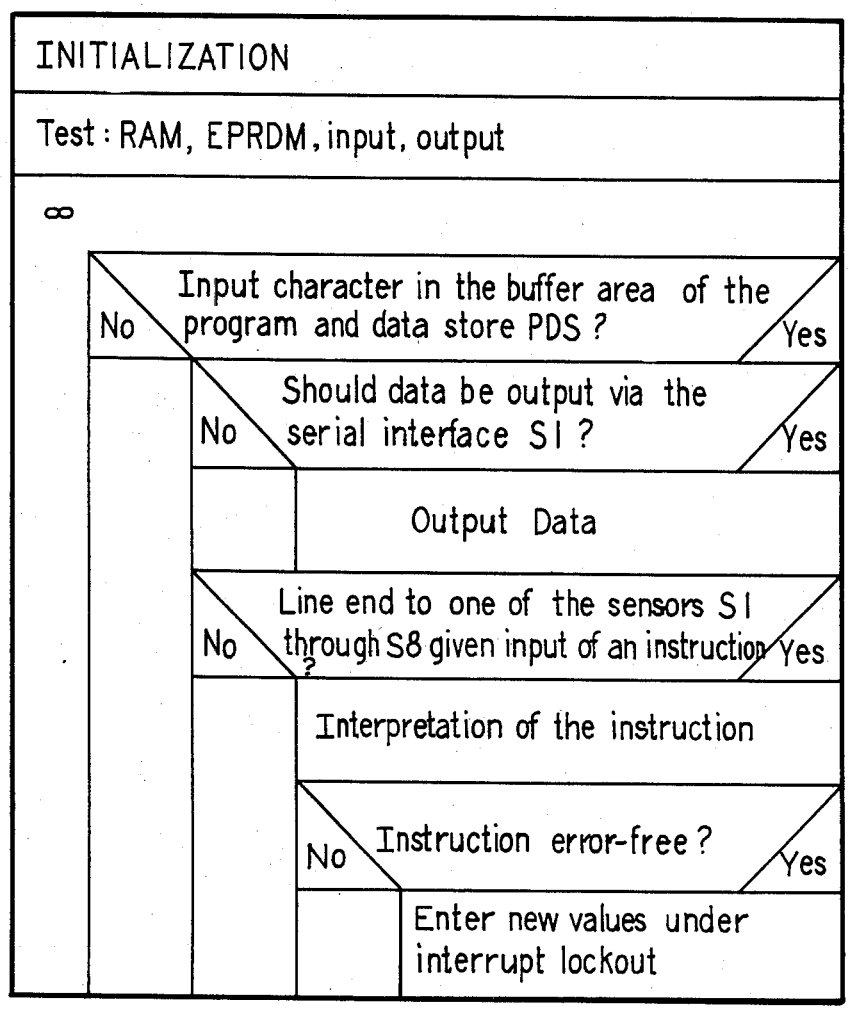
FIG. 13 is a structogram for the background program for the programmable sensor interface shown in FIGS. 3 and 6.

FIG. 13 is a structogram for the background program of the programmable sensor interface PSI″. When an instruction from one of the sensors S1 through S8 is included among the input characters, an end of line signal is awaited. The character sequence corresponding to the instruction is then interpreted. When a following check shows that the instruction is error-free, new values such as, for example, a new number of a sensor, new range limits, and the like are entered under an interrupt lockout.

Figure 14:
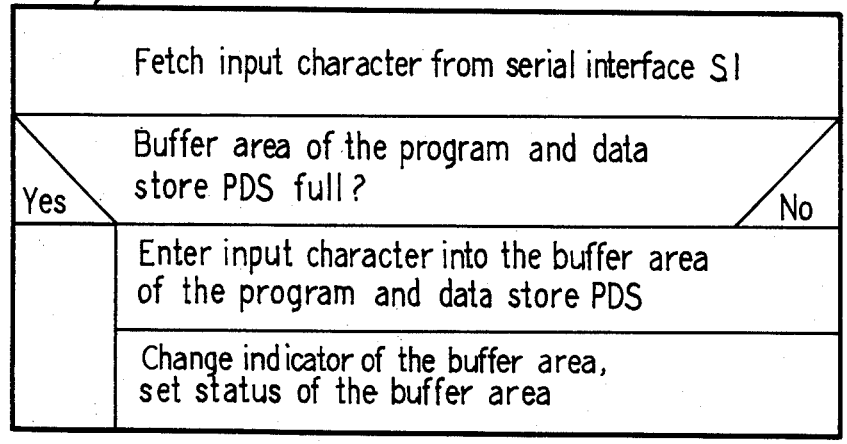
FIG. 14 is a structogram for the interrupt routine given data reception of the programmable sensor interface shown in FIGS. 3 and 6.

A structogram for the interrupt routine for reception of data via the serial interface SI of the programmable sensor interface PSI″ as shown in FIG. 14.

Figure 15:
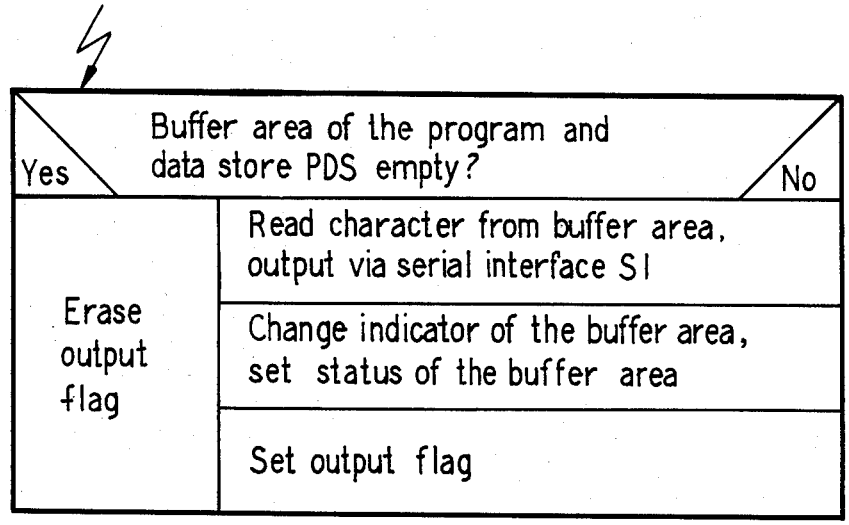
FIG. 15 is a structogram for the interrupt routine given data output for the programmable sensor interface shown in FIGS. 3 and 6.
Figure 16:
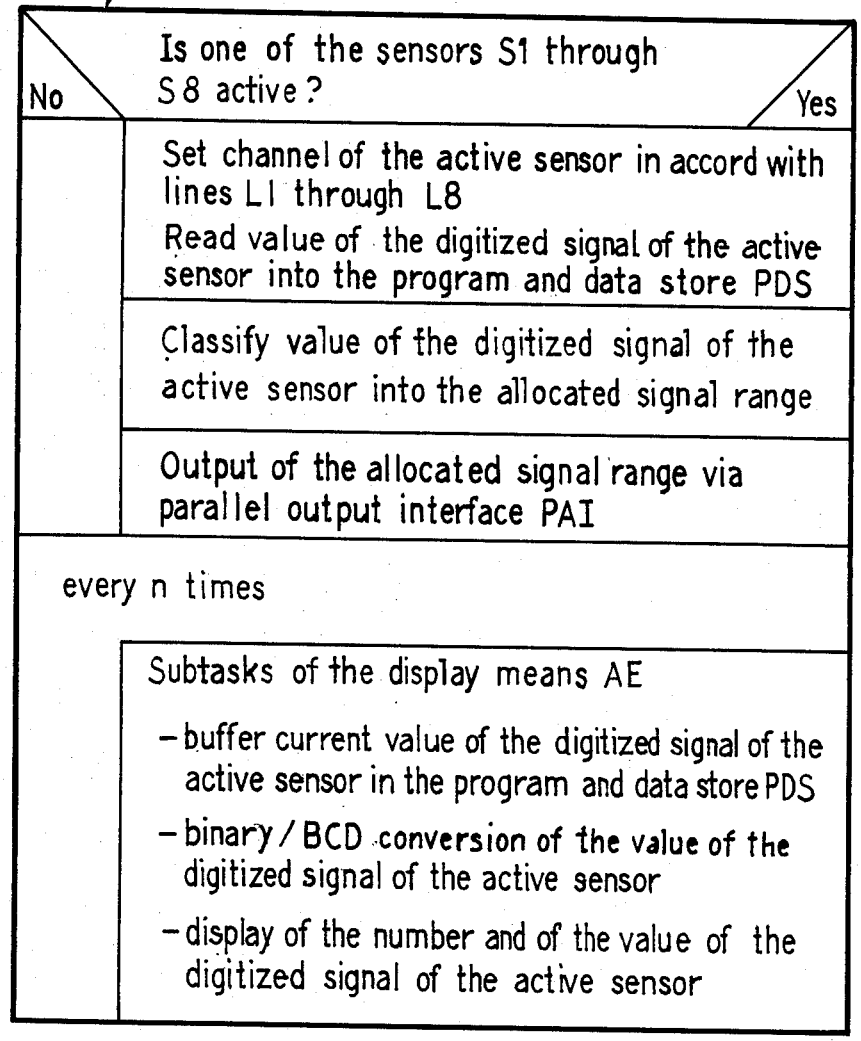
FIG. 16 is a structogram for the interrupt routine given range classification and range output for the programmable sensor interface shown in FIGS. 3 and 6.

A structogram for the interrupt routine for the output data via the serial interface SI of the programmable sensor interface PSI″ is shown in FIG. 15. A structogram for the interrupt routine for classification of signals of a sensor into the allocated sensor ranges is shown in FIG. 16, output of the signal ranges taking place via the parallel output interface PAI of the programmable sensor interface PSI″, and display of the output signal being presented on the display unit AE connected to the programmable sensor interface PSI″. The loop for the display means AE is executed only every n times, where n is a selectable whole number such as, for example, n=10.

Although modifications and changes may be suggested by those skilled in the art it is the intention of the inventor to embody within the patent warranted hereon all changes and modifications as reasonably and properly come within the scope of his contribution to the art.

I claim as my invention:

1. A manipulation device comprising:
   a robot means;
   a control unit connected to said robot means for controlling the operation thereof;
   at least one sensor located on said robot means for detecting a parameter usable in controlling operation of said robot means, said sensor emitting an output signal within a sensor range;
   a programmable sensor interface interconnected between said sensor and said control unit, said programmable sensor interface including at least one microprocessor and at least one programmable memory connected to said microprocessor, said memory having a plurality of thresholds stored therein allocated to said sensor dividing said sensor range into at least three sub-ranges, and said microprocessor classifying an output signal received from said sensor into one of said sub-ranges and transmitting the result of said classification to said control unit for use in controlling the operation of said robot means.

2. A manipulation device as claimed in claim 1 comprising a plurality of sensors and a means in said control unit for selecting one of said sensors, said output signal from the selected sensor being classified and transmitted by said microprocessor to said control unit.

3. A manipulation device as claimed in claim 2 further comprising a terminal means, and wherein said means for selecting one of said sensors is a serial interface interconnected between said control unit and said terminal means.

4. A manipulation device as claimed in claim 2 wherein said control unit includes a plurality of parallel binary output lines connected to said means for selecting one of said sensors for use in selecting said sensors.

5. A manipulation device as claimed in claim 3 wherein selection of one of said sensors is undertaken through said terminal means and wherein said terminal means is also connected to said programmable memory for entering said thresholds therein.

6. A manipulation device as claimed in claim 2 further comprising a display means connected to said programmable sensor interface for displaying an identification of the selected sensor, the output signal of said selected sensor, and the signal sub-range allocated to said selected sensor.

7. A manipulation device as claimed in claim 1 wherein said control unit has a plurality of binary input lines interconnected between said control unit and said programmable sensor interface respectively allocated to each of said signal sub-ranges of each sensor.

8. A manipulation device as claimed in claim 7 further comprising a multiplexer interconnected between said binary input lines and said programmable sensor interface.

9. A manipulation device as claimed in claim 1 wherein said output signal of said sensor is an analog signal, and further comprising an analog-to-digital converter in said programmable sensor interface.

10. A manipulation device as claimed in claim 7 wherein said programmable sensor interface further includes a parallel output interface having a plurality of binary outputs respectively connected to said binary input lines of said control unit.

11. A manipulation device as claimed in claim 2 further comprising a serial interface means in said programmable sensor interface connected to said serial interface between said control unit and said terminal means.

12. A manipulation device as claimed in claim 1 wherein said control unit has a plurality of binary outputs and wherein said programmable sensor interface further includes a parallel input interface having a plurality of binary inputs to which said binary outputs of said control unit are connected.

13. A manipulation device as claimed in claim 1 wherein said robot means has a programmable claw means comprising:
   a movable gripper means;
   at least one sensor carried on said gripper means;
   at least one drive motor connected to said gripper means and to said control unit through a digital-to-analog converter in said programmable sensor interface,
   output signals of said sensor on said gripper being supplied to said microprocessor and said microprocessor controlling said drive motor for controlling said gripper based on selected rated values supplied to said microprocessor.

14. A manipulation device as claimed in claim 13 wherein said sensor is a path measuring means and wherein said microprocessor controls the position of said gripper means.

15. A manipulation device as claimed in claim 13 wherein said sensor is a force measuring means and wherein said microprocessor controls the gripper force of said gripper means.

16. A manipulation device as claimed in claim 13 further comprising a serial interface interconnecting said programmable sensor interface and said control unit for prescribing said rated values.

17. A manipulation device as claimed in claim 13 wherein said rated values are stored in said memory in said programmable sensor interface.

* * * * *